United States Patent [19]

Katayama et al.

[11] Patent Number: 4,950,142
[45] Date of Patent: Aug. 21, 1990

[54] GREEN TIRE INSERTING APPARATUS IN A TIRE VULCANIZING MACHINE

[75] Inventors: Hideaki Katayama; Toshifumi Murakami, both of Nagasaki, Japan

[73] Assignee: Mitsubishi Jukogyo Kabushiki Kaisha, Tokyo, Japan

[21] Appl. No.: 295,196

[22] Filed: Jan. 9, 1989

[30] Foreign Application Priority Data

Jan. 27, 1988 [JP] Japan .................................. 63-14564

[51] Int. Cl.$^5$ ............................................. B29D 30/06
[52] U.S. Cl. ......................................... 425/38; 425/32
[58] Field of Search ....................... 425/19, 31, 32, 36, 425/38, 58

[56] References Cited

U.S. PATENT DOCUMENTS

| | | | |
|---|---|---|---|
| 2,976,566 | 3/1961 | Soderquist | 425/38 |
| 4,045,150 | 8/1977 | Gazuit | 425/38 |
| 4,236,883 | 12/1980 | Turk et al. | 425/38 |
| 4,600,370 | 7/1986 | Kanedo et al. | 425/38 |
| 4,608,219 | 8/1986 | Singh et al. | 425/38 |
| 4,637,644 | 1/1987 | Trethowan | 425/38 |
| 4,741,682 | 5/1988 | Mauro | 425/38 |

Primary Examiner—James C. Housel
Attorney, Agent, or Firm—Wenderoth, Lind & Ponack

[57] ABSTRACT

A green tire inserting apparatus with which upper and lower bead portions of a green tire can be inserted correctly and surely into bead rings of upper and lower metal molds. An upper bead portion and a lower bead portion of a green tire are gripped in a true-circular shape by separate segments to be pushed respectively into bead rings of upper and lower metal molds in a vulcanizing machine. Cylinders and linkages for radially expanding the segments and pushing the bead portions into the bead rings are provided in an upper portion and a lower portion of a center mechanism of a vulcanizing machine. There are provided stoppers for presetting a segment expansion limit, which are adjustable according to variation of a bead diameter of a green tire, and bead height regulators, which are adjustable according to variation of a height of a green tire. The adjustment can be made to be automatic.

11 Claims, 10 Drawing Sheets

GREEN TIRE INSERTING APPARATUS IN A TIRE VULCANIZING MACHINE

BACKGROUND OF THE INVENTION

1. Field of the Invention

The present invention relates to a green tire inserting apparatus for mounting a green tire to upper and lower metal molds in a tire vulcanizing machine.

2. Description of the Prior Art

In general, a tire vulcanizing machine is composed of an upper metal mold and a lower metal mold disposed in a manner relatively movable in the vertical direction, and a center mechanism having a bladder or the like and disposed in the aforementioned lower metal mold.

In the case where a green tire is to be inserted into upper and lower metal mold bead ring portions in a vulcanizing machine centered correctly, in the prior art the green tire was transferred to the position of the metal molds by means of a loader and the above-mentioned green tire was made to fit to the upper metal mold bead ring portion or to the lower metal mold bead ring portion.

According to the technique in the prior art as described above, a green tire bead portion and a metal mold bead ring portion on only one side, upper or lower, are fitted to each other, and a bead portion of the green tire on the other side cannot be fitted correctly to the metal mold bead ring portion. Consequently, it is doubtful whether or not the bead portions of the green tire can be inserted correctly into the bead portions of the metal molds, and when a green tire is inserted into upper and lower metal molds in a vulcanizing machine, sometimes bead portions of a green tire would be forcibly pushed into the upper and lower metal mold bead rings by means of a bladder of the like. In the event that the green tire bead portions were not inserted correctly into the metal mold bead rings in the above-described manner, the quality of the completed tire would be poor.

Also, if a green tire was deformed before it was transferred by means of a loader, since means for shaping a bead of a green tire into a true circle were not provided, the bead could not be fitted correctly to the metal mold bead portion, and this adversely affected the uniformity of a tire after vulcanization.

SUMMARY OF THE INVENTION

It is therefore one object of the present invention to provide a green tire inserting apparatus in a tire vulcanizing machine for inserting upper and lower bead portions of a green tire correctly and surely into bead rings of upper and lower metal molds.

According to one feature of the present invention, there is provided a green tire inserting apparatus in a tire vulcanizing machine, including two levels of upper and lower chuck means disposed in a vertically movable manner at the central portion of the tire vulcanizing machine for gripping bead portions of a green tire, wherein the aforementioned chuck means comprises a plurality of bead expanding segments which are movable in the radial direction of the green tire, bead push-in segments supported on the outside surfaces of the aforementioned bead expanding segments in a vertically slidable manner, and drive means for these segments, and wherein there are further provided bead diameter regulating means for defining an expansion limit position of the aforementioned bead expanding segments, and bead height regulating means for defining heights of the upper and lower chuck means.

More particularly, the inventive concept of the present invention resides essentially in the following points:

(1) An upper bead portion and a lower bead portion of a green tire are gripped in a true-circular shape by separate segments to be pushed respectively into bead rings of upper and lower metal molds in a vulcanizing machine.

(2) Cylinders and linkages for expanding the aforementioned segments and pushing the bead portions into the bead rings are provided in an upper portion and a lower portion of a center mechanism of a vulcanizing machine.

(3) Stoppers for presetting a segment expansion limit which are adjustable according to variation of a bead diameter of a green tire, are provided.

(4) Bead height regulating means which are adjustable according to variation of a height of a green tire, are provided.

(5) The means described in numbered paragraph (3) and (4) above are made to be automatically adjustable.

In operation, the upper and lower bead expanding segments forcibly expand the upper and lower bead portions of the green tire to a predetermined size, and subsequently, the bead push-in segments push the upper and lower bead portions into bead rings of the upper and lower metal molds.

By the bead height and bead diameter regulating means, the positions and segment expansion limits of the upper and lower segment assemblies are set at the sizes corresponding to various tires.

According to the present invention, owing to the fact that there are provided bead expanding segments which can expand and contract in the radial direction and bead push-in segments which can move vertically along the aforementioned bead expanding segments, and that the upper and lower bead portions of the green tire are mechanically pushed into the bead rings of the upper and lower metal molds, centering between the metal molds and the green tire can be achieved surely, and so, quality of vulcanized tires can be improved. In addition, since the bead portions are sealed, it becomes possible to carry out bladderless vulcanization. Furthermore, owing to the provision of bead diameter regulating means and bead height regulating means, various sizes of green tires can be inserted into a tire vulcanizing machine by adjusting the height and diameter of the chuck means.

The above-mentioned and other objects, features and advantages of the present invention will become more apparent by reference to the following description of one preferred embodiment of the invention taken in conjunction with the accompanying drawings.

DESCRIPTION OF THE PREFERRED EMBODIMENT

Figure 1:
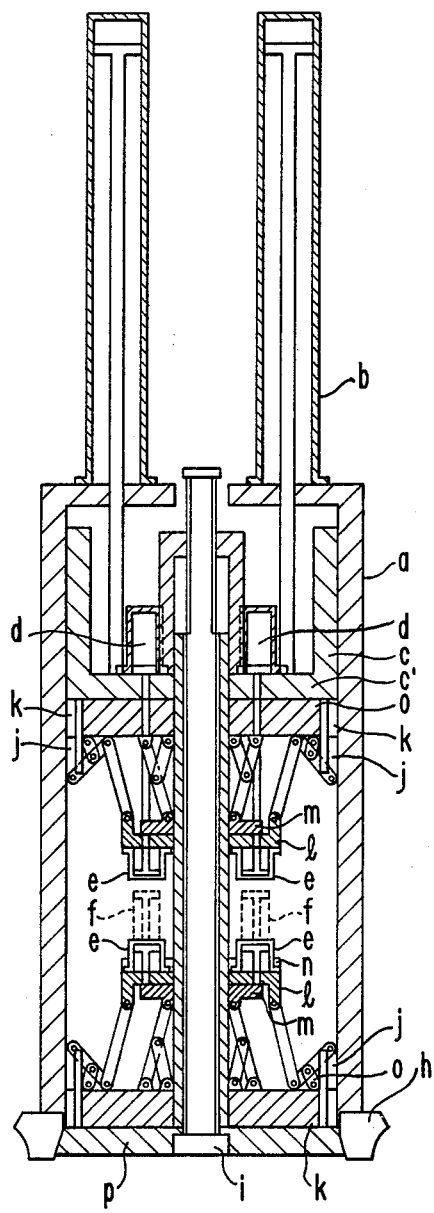
FIG. 1 is a cross-section side view of a green tire inserting apparatus according to the present invention.

In FIGS. 1 through 9, reference character a designates an outer cylinder, character b designates an elevator cylinder, character c designates an inner cylinder, character c' designates an inner cylinder plate section, character d designates upper segment expanding/contracting cylinders, character e designates bead push-in cylinders, character f designates lower segment expanding/contracting cylinders, character g designates guides, character h designates metal mold bead rings, character i designates a bead height regulating bolt, character j designates bead push-in segments, character k designate bead expanding segments, character l designates push-in plates, character m designates segment expanding/contracting plates, character n designates a fixed plate, character o designates slide plates, character p designates a lower plate, character q designates threads, character r designates nuts, character s designates segment adjusting bolts, character t designates hexagonal rods, charactors u and v respectively designate sprockets, character w designates a chain, character x designates links, reference numeral 1 designates a bolster plate, numeral 2 designates a head insulator plate, numeral 3 designates an upper heater plate, numeral 4 designates an upper metal mold, numeral 5 designates a lower metal mold, numeral 6 designates an outer grip loader, numeral 7 designates a green tire, numeral 7a designates bead portions of a green tire, and numeral 10 designates a chuck mechanism.

A plurality of guides g respectively slidably holding a plurality of slide plates o which have bead expanding segments k fixedly secured to their outer ends, are disposed radially, and thus form a segment assembly.

Figure 5A:
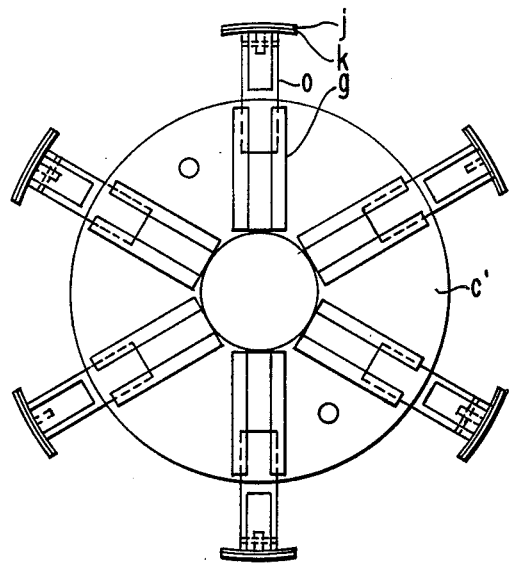
FIG. 5(A) is a plan view of a segment assembly in an expanded condition.
Figure 5B:
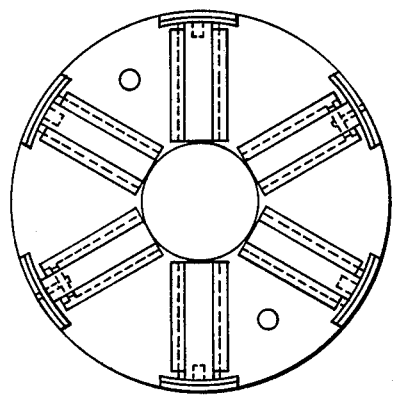
FIG. 5(B) is a plan view of the same segment assembly in a contracted condition.

FIG. 5(A) shows an expanded condition of the segment assembly in which the slide plates o have moved in the radial direction of a green tire, and FIG. 5(B) shows a contracted condition of the segment assembly.

Such a segment assembly is disposed at each of upper and lower positions in correspondence to the upper and lower bead positions of a green tire.

More particularly, the guides g of the upper segment assembly are mounted on the lower surface of the inner cylinder plate c', and the guides g of the lower segment assembly are mounted on the upper surface of the lower plate p. The lower ends of the piston rods of the elevator cylinder b provided at the top of the outer cylinder a are fixedly secured to the inner cylinder c, and hence the inner cylinder c is raised and lowered by actuation of these elevator cylinders b.

On the outer side of the bead expansion segment k is held the bead push-in segment j in a vertically slidable manner, and links are mounted to the slide plate o and the bead push-in segment j as will be described later.

The bead expansion segments k, the bead push-in segments j, the bead push-in plate l, the segment expanding/contracting plate m, the segment expanding/contracting cylinders d and f, the bead push-in cylinders e and the links for connecting these members, jointly form the chuck means.

FIG. 1 shows the condition where the segment assembly has been pulled up by the elevator cylinders b and the chuck means has been accommodated within the outer cylinder a.

It is to be noted that the cylinders d are fixedly secured to the inner cylinder c, and the lower ends of their piston rods are fixedly secured to the plate m. The cylinders f are fixedly secured to the fixed plate n, and the lower ends of their piston rods are fixedly secured to the plate m. The cylinders e are fixedly secured to the bead push-in plate 1, and the tip ends of their piston rods are fixedly secured to the plate m.

Though the upper and lower chuck means are similar mechanisms, the upper cylinders for use in the expanding/contracting operations of the upper and lower segments k is the cylinders d, while the lower cylinders for the same use are the cylinders f, and since the mounting positions of the cylinders are different between these cylinders d and f, projection and retraction of these cylinders result in inverse operations to each other. With respect to the other points, the upper chuck means and the lower chuck means are identical to each other. The operations will be described later with reference to FIGS. 9 to 11.

Figure 2:
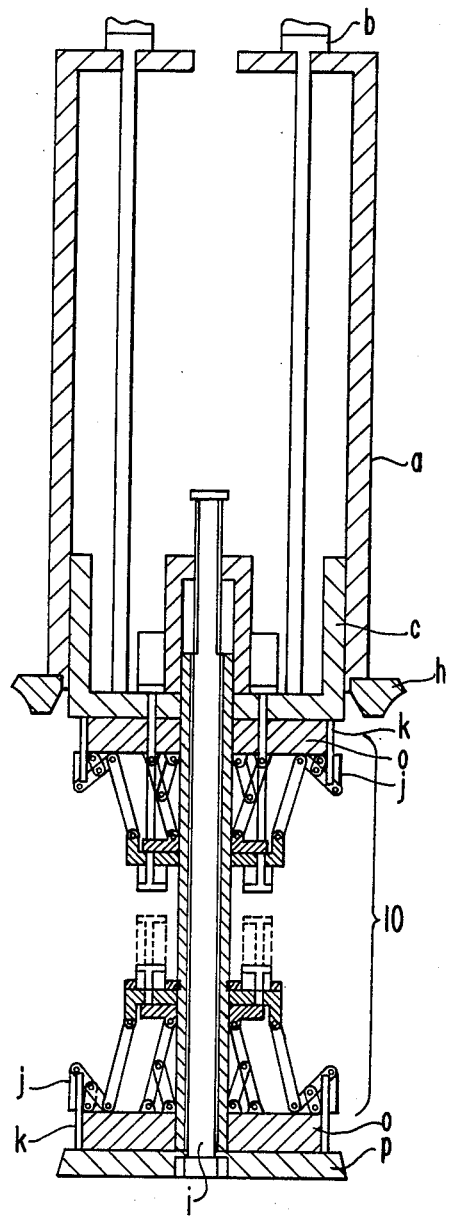
FIG. 2 is a cross-section side view of the same green tire inserting apparatus where the chuck means shown in FIG. 1 has been lowered.

FIG. 2 shows the condition where the inner cylinder c holding the chuck means has been lowered from the inside of the outer cylinder a by the elevator cylinder b.

Figure 3:
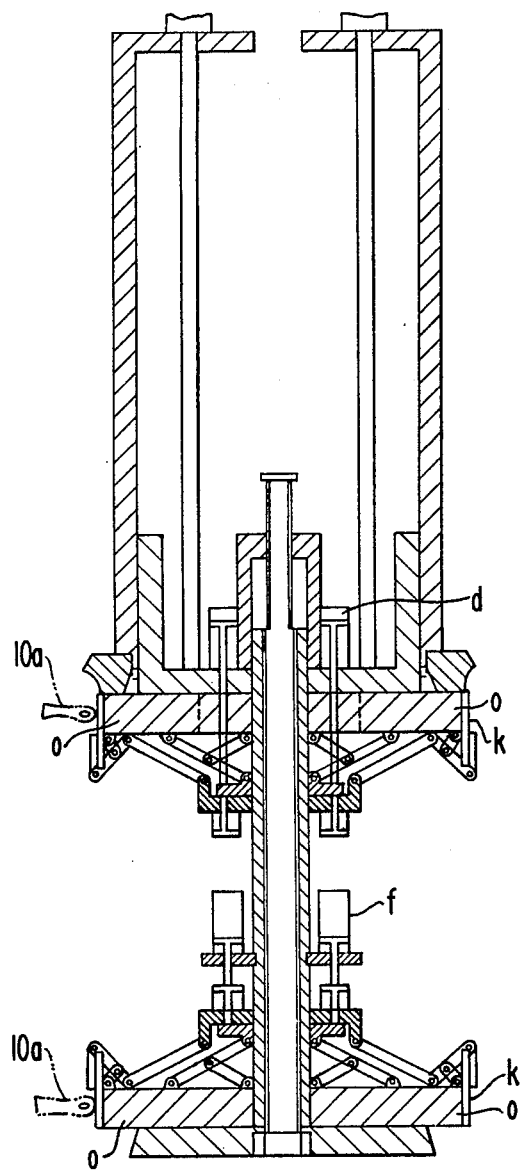
FIG. 3 is a cross-section side view of the same green tire inserting apparatus showing the bead expanding condition.

FIG. 3 shows the condition where the upper and lower segments k have been expanded by the upper segment expanding/contracting cylinder d and the lower segment expanding/contracting cylinder f.

Figure 4:
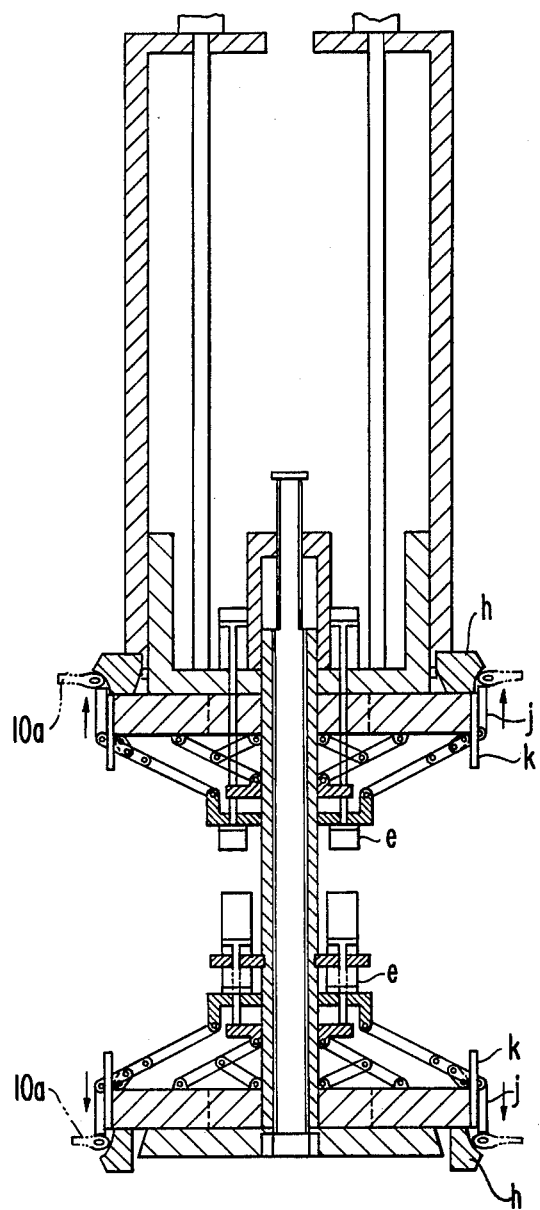
FIG. 4 is a cross-section side view of the same green tire inserting apparatus showing the bead push-in condition.

FIG. 4 shows the condition where in both the upper and lower chuck means, the bead push-in segments j have slid along the outer surfaces of the bead expansion segments k and have pushed the bead portions of a green tire into the metal mold bead rings h as a result of actuation of the bead push-in cylinders and the associated links.

Figure 6A:
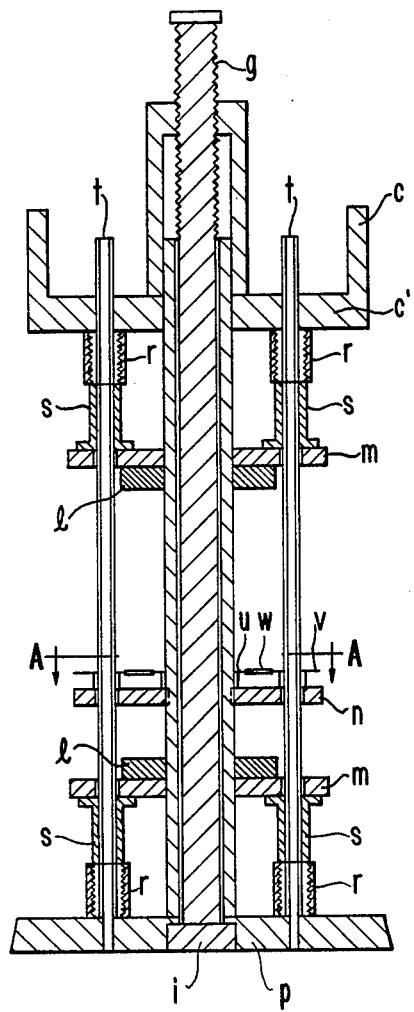
FIG. 6(A) is a cross-section side view of bead height regulating means and bead diameter regulating means.
Figure 6B:
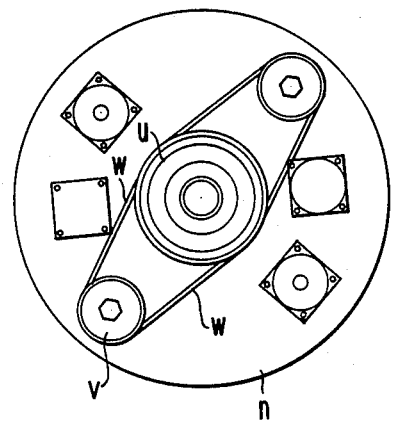
FIG. 6(B) is a transverse cross-section view taken along line A—A in FIG. 6(A) as viewed in the direction of the arrows.

FIG. 6 shows the means for use in bead height adjustment and bead diameter adjustment. The bead height regulating means operates in such manner that by turning the bead height regulating bolt i, the lower plate p is raised or lowered via the threads q and thereby the position of the lower plate p is determined. In this way, the distance between the upper segments and the lower segments is varied, and the bead height can be regulated. The bead diameter regulating means consists of the nuts r mounted to the inner cylinder plate section c' and the lower plate p, the upper and lower segment adjusting bolts s threadedly engaged with the nuts r (the upper and lower bolts s are threaded in the opposite directions to each other), and the hexagonal rods t penetrating through the segment adjusting bolts s. Since the positions of the inner cylinder plate section c' and the lower plate p are fixed by the elevator cylinder b and the bead height regulating bolt i, by turning the hexagonal rods t the segment adjusting bolts s are rotated and they are raised or lowered.

Two hexagonal rods t are provided, and they are synchronously rotated by means of the sprockets u and v and the chain w. In this way the four segment adjusting bolts are adjusted at predetermined positions, so that the extent of expansion of the segments k are determined by the segment expanding/contracting plate m butting against the segment adjusting bolts s.

Figure 7A:
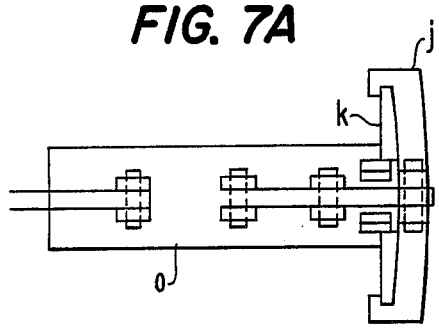
FIG. 7(A) is a plan view of a bead expanding segment portion and a bead push-in segment portion.
Figure 7B:
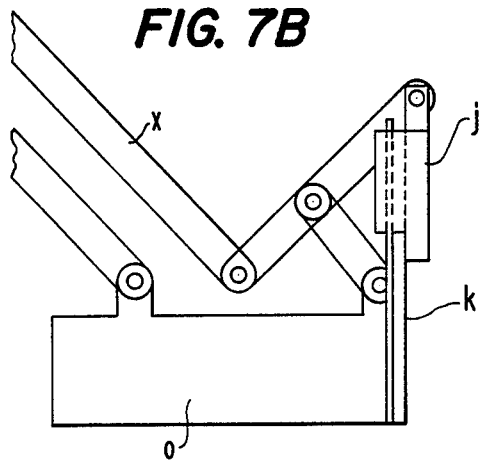
FIG. 7(B) is a side view of the portions shown in FIG. 7(A)
Figure 7C:
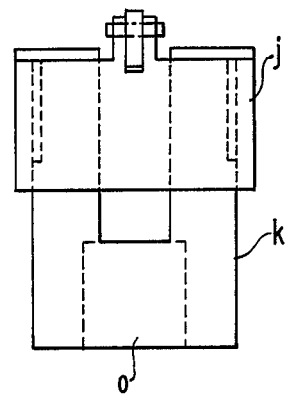
FIG. 7(C) is a front view of the portions shown in FIGS. 7(A) and 7(B)
Figure 8A:
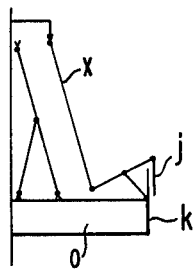
FIGS. 8(A) and 8(B) are schematic views showing an outline of operation of the chuck means.
Figure 8B:
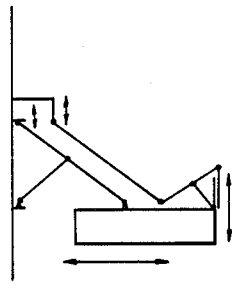

FIGS. 7 and 8 show the mechanism of the segments and the bead push-in portion, in which the bead push-in segment j is guided by the bead expansion segment k and is made to slide along the outer side surface of the segment k by the links x to perform ascending and descending operations.

The operation of the chuck means will be described in connection to the lower chuck means illustrated in FIGS. 9 to 11.

Figure 9A:
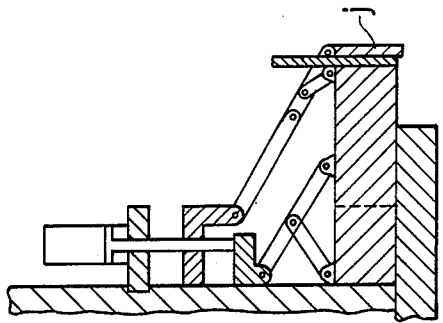
FIGS. 9(A), 9(B) and 9(C) are cross-section side views showing successive steps of operation of a segment expanding/contracting cylinder.

FIG. 9(A) shows the condition where the segments k are contracted by the segment expanding/contracting cylinders f.

Figure 10A:
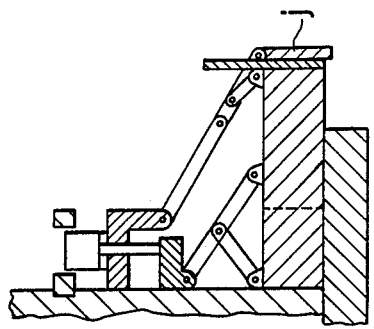
FIGS. 10(A), 10(B) and 10(C) are cross-section side views showing successive steps of operation of a bead push-in cylinder.

FIG. 10(A) shows the condition where the bead push-in segments j are raised by the bead push-in cylinders e.

Figure 11C:
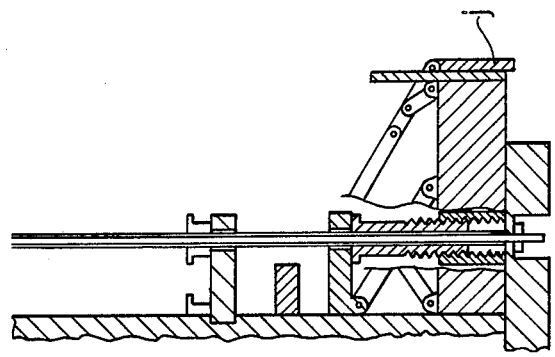
FIGS. 11(A), 11(B) and 11(C) are cross-section side views showing successive steps of operation of a bead diameter regulating mechanism.
Figure 11B:
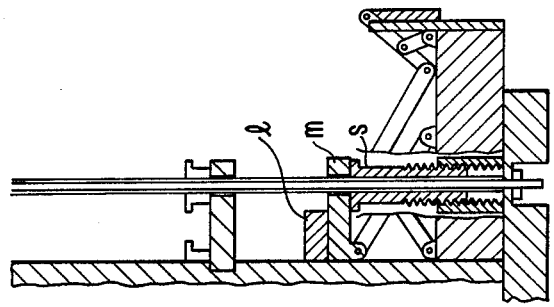
Figure 11A:
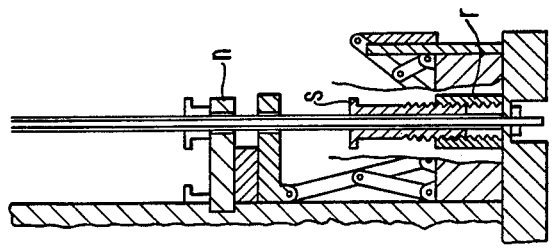

FIG. 11(A) shows the segment adjusting bolt s set at a predetermined height.

Figure 9B:
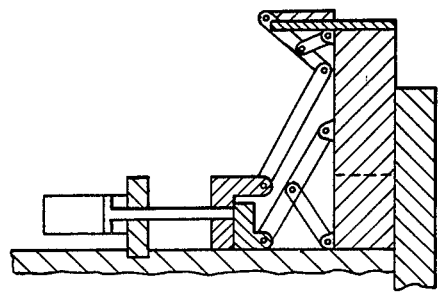

FIG. 9(B) shows the condition where the segments k are expanded by the segment expanding/contracting cylinders f.

Figure 10B:
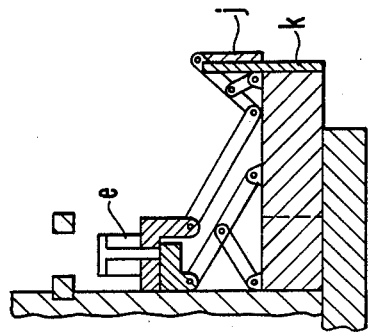

FIG. 10(B) shows the condition of the bead push-in cylinders e and the bead push-in segments j when the segments k are expanded.

FIG. 11(B) shows the condition where the segment expanding/contracting plate m butts against the segment adjusting bolts s and thereby an expanding limit of the bead expansion segments is defined.

Figure 9C:
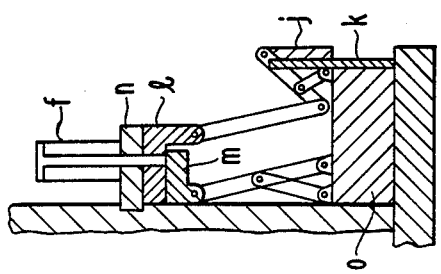
Figure 10C:
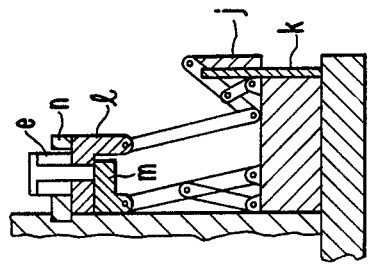

FIGS. 9(C), 10(C) and 11(C) all show the condition where the bead push-in segments j are lowered.

Now the overall operation will be explained with reference to FIG. 12.

Figure 12A:
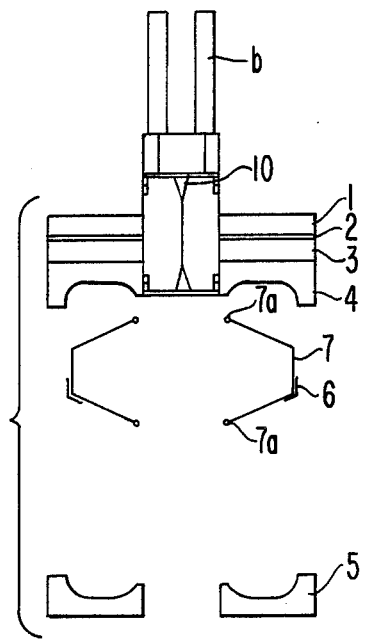
FIGS. 12(A), 12(B), 12(C) and 12(D) are overall schematic views showing successive steps of operation of the apparatus shown in FIG. 1.

FIG. 12(A) shows the condition where the chuck mechanism 10 is accommodated at the center of the bolster plate 1, the heat insulator plate 2, the upper heater plate 3 and the upper metal mold 4 by the elevator cylinders b, and the green tire 7 has been brought in between the lower metal mold 5 and the upper metal mold 4 by means of the outer grip loader 6.

Figure 12B:
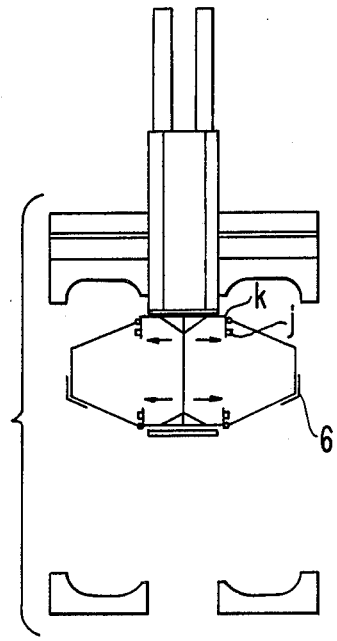

FIG. 12(B) shows the condition where the chuck mechanism 10 has been lowered by the elevator cylinders b, the bead expansion segments k have been expanded and the green tire 7 has been gripped thereby.

Thereafter, the outer grip loader 6 retreats outwardly from the space between the lower metal mold 5 and the upper metal mold 4.

Figure 12C:
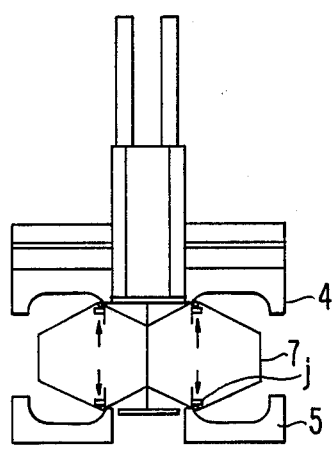

FIG. 12(C) shows the condition where the upper metal mold 4 has been lowered, the lower bead portion of the green tire 7 has come to the position of the bead ring h of the lower metal mold 5 and the upper bead portion of the green tire 7 has come to the position of the bead ring h of the upper metal mold. The bead push-in segments j have pushed the bead portions of the green tire 7 into the bead rings of the upper and lower bead rings 4 and 5.

Figure 12D:
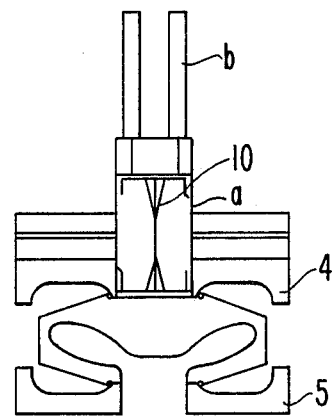

FIG. 12(D) shows the condition where, after the bead portions of the green tire were pushed into the bead rings of the metal molds, the bead expansion segments k have been all contracted, and then the chuck mechanism 10 has been raised by the elevator cylinders b and accommodated within the outer cylinder a.

As will be obvious from the detailed description above, the present invention can provide the following advantages:

(1) Owing to the fact that there are provided bead expanding segments which can expand and contract in the radial direction and bead push-in segments which can move vertically along the aforementioned bead expanding segments, and that the upper and lower bead portions of the green tire are mechanically pushed into the bead rings of the upper and lower metal molds, centering between the metal molds and the green tire can be achieved surely, and quality of vulcanized tires can be improved. In addition, since the bead portions are sealed, it becomes possible to carry out bladderless vulcanization.

(2) Owing to the provision of bead diameter regulating means and bead height regulating means, various sizes of green tires can be inserted into a tire vulcanizing machine by adjusting the height and diameter of the chuck-means.

While a principle of the present invention has been described above in connection to one preferred embodiment of the invention, it is a matter of course that many apparently widely different embodiments of the present invention could be made without departing from the spirit of the present invention.

WHAT IS CLAIMED IS:

1. An apparatus for inserting green tires in a vulcanizing machine, comprising;

an inner cylinder having a longitudinal axis;

first and second chuck means connected to said inner cylinder, said first and second chuck means being spaced from each other along said axis, each said chuck means including a plurality of expanding segments radially spaced about said axis and mounted for sliding movement radially of said axis between a contracted position and an expanded position spaced radially further from said axis than said contracted position, each said chuck means further including a plurality of push-in segments, each push-in segment being mounted on a radially outer face of an associated one of said expanding segments for sliding movement substantially parallel to said axis between a retracted position and an extended position, said push-in segments of each one of said chuck means moving away from the other one of said chuck means when moving from said retracted to said extended position, each said chuck means further including means for moving each of said expanding segments between said contracted and said expanded position and means for moving each of said push-in segments between said retracted and said extended position;

whereby a green tire may be held by said apparatus with each bead contacted by said outer radial faces of said expanding segments of an associated one of said chuck means, said expanding segments may be moved to said expanded position to thereby expand the diameters of the beads to at least near the diameter of mold bead rings which are in close proximity thereto, and said push-in segments may be moved to said extended positions to move the beads from said expanding segments to an associated one of the mold bead rings.

2. An apparatus as in claim 1, further comprising means for adjusting the relative spacing of said first and said second chuck means along said axis.

3. An apparatus as in claim 2, wherein said inner cylinder includes a first plate extending in a plane substantially normal to said axis, said expanding segments of said first chuck means being slidingly mounted on a face of said first plate furthest from said inner cylinder, said inner cylinder further including a hollow rod slidingly extending therefrom substantially coaxial to said axis, a second plate being mounted on a free end of said rod and extending substantially parallel to said first plate, said expanding segments of said second chuck means being slidingly mounted on a face of said second plate closest to said inner cylinder, and a bolt rotatably extending through said plates, said rod, and said inner cylinder, said bolt having an enlarged portion abutting a face of said second plate opposite said inner cylinder and said bolt having a section threadedly engaged with said inner cylinder, whereby said bolt constitutes said means for adjusting the relative spacing of said chuck means.

4. An apparatus as in claim 1, further comprising means for adjusting the radial position of said expanded position of said expanding segments.

5. An apparatus as in claim 4, further comprising means for adjusting the relative spacing of said first and said second chuck means along said axis.

6. An apparatus as in claim 4, wherein said means for adjusting the radial position of said expanded position includes at least one adjustable stop connected to said inner cylinder for each said chuck means.

7. An apparatus as in claim 6, wherein said means for moving said expanding segments includes at least one linear actuator connected to said inner cylinder for each said chuck means and a linkage extending between each of said expanding segments and an associated one of said actuators, and wherein each said adjustable stop limits movement of an associated one of said actuators.

8. An apparatus as in claim 7, further comprising means for simultaneously adjusting each of said stops.

9. An apparatus as in claim 7, further comprising means for adjusting the relative spacing of said first and said second chuck means along said axis.

10. An apparatus as in claim 9, wherein said inner cylinder includes a first plate extending in a plane substantially normal to said axis, said expanding segments of said first chuck means being slidingly mounted on a face of said first plate furthest from said inner cylinder, said inner cylinder further including a hollow rod slidingly extending therefrom substantially coaxial to said axis, a second plate being mounted on a free end of said rod and extending substantially parallel to said first plate, said expanding segments of said second chuck means being slidingly mounted on a face of said second plate closest to said inner cylinder, and a bolt rotatably extending through said plates, said rod, and said inner cylinder, said bolt having an enlarged portion abutting a face of said second plate opposite said inner cylinder and said bolt having a section threadedly engaged with said inner cylinder, whereby said bolt constitutes said means for adjusting the relative spacing of said chuck means.

11. An apparatus as in claim 10, further comprising an outer cylinder, said inner cylinder being coaxially mounted in said outer cylinder for sliding movement in directions substantially parallel to said longitudinal axis, and means for moving said inner cylinder with respect to said outer cylinder in said directions.

* * * * *